United States Patent
Chien et al.

(10) Patent No.: US 8,374,595 B2
(45) Date of Patent: Feb. 12, 2013

(54) HANDHELD ELECTRONIC DEVICE AND OPERATING METHOD THEREOF

(75) Inventors: Chih-Ling Chien, Taoyuan County (TW); Hsiao-Chuan Huang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 275 days.

(21) Appl. No.: 12/432,759

(22) Filed: Apr. 30, 2009

(65) Prior Publication Data

US 2010/0009721 A1    Jan. 14, 2010

(30) Foreign Application Priority Data

Jul. 8, 2008    (TW) ................................ 97125735 A

(51) Int. Cl.
*H04W 24/00*    (2009.01)
*H04M 1/02*    (2006.01)

(52) U.S. Cl. ........ 455/423; 345/156; 381/182; 340/689; 379/424; 348/208.3

(58) Field of Classification Search .................. 455/425, 455/550.1, 552.1, 553.1, 556.1, 575.1, 575.3, 455/575.4, 569.1, 564, 565; 379/433.13, 379/424; 345/156; 340/689

See application file for complete search history.

(56) References Cited

U.S. PATENT DOCUMENTS

| | | | | |
|---|---|---|---|---|
| 6,292,563 | B1 * | 9/2001 | Clark et al. | 379/433.13 |
| 6,882,335 | B2 * | 4/2005 | Saarinen | 345/156 |
| 2007/0036348 | A1 * | 2/2007 | Orr | 379/424 |
| 2008/0211685 | A1 * | 9/2008 | Grady et al. | 340/689 |

FOREIGN PATENT DOCUMENTS

EP    1615407 A1 *    1/2006

* cited by examiner

*Primary Examiner* — Kent Chang
*Assistant Examiner* — Benjamin Morales Fernandez
(74) *Attorney, Agent, or Firm* — Jianq Chyun IP Office

(57) ABSTRACT

A handheld electronic device and an operating method thereof are provided, in which at least two sets of sound outputting modules and sound receiving modules are disposed in the handheld electronic device. The operating method detects an orientation of the handheld electronic device by a motion detecting module and enables different sets of the sound outputting modules and the sound receiving modules according to a variation of the orientation of the handheld electronic device, so as to change a direction of a call operation, and thus a user can successfully make a phone call, even if the handheld electronic device is held upside down. Furthermore, the operating method can control the sound outputting modules and the sound receiving modules individually or collectively according to actual demands to achieve a multifunctional product design.

12 Claims, 3 Drawing Sheets

HANDHELD ELECTRONIC DEVICE AND OPERATING METHOD THEREOF

CROSS-REFERENCE TO RELATED APPLICATION

This application claims the priority benefit of Taiwan application serial no. 97125735, filed on Jul. 8, 2008. The entirety of the above-mentioned patent application is hereby incorporated by reference herein and made a part of specification.

BACKGROUND OF THE INVENTION

1. Field of the Invention

The present invention generally relates to a handheld electronic device, in particular, to a handheld electronic device, which switches a using state according to an orientation of the handheld electronic device itself.

2. Description of Related Art

A handheld electronic device refers to an electronic device operated by a user while holding it with hands, which is relatively small and light, such that it is convenient for the user to carry along. Currently, the common handheld electronic device includes, for example, mobile phones, multimedia players, personal digital assistants (PDAs), handheld computers, handheld game players, and handheld satellite navigators.

Currently, the commercially-available handheld electronic device with a function of making a call adopts a design that a microphone and a receiver are respectively disposed on upper and lower ends of the handheld electronic device, such that it is convenient for the user to make a call while holding the handheld electronic device in a manner that the receiver is close to the ear and the microphone is close to the mouth.

However, with the rapid progress of the function and appearance design of the handheld electronic device, the operation manner is not limited to a simple motion in a single holding direction familiar to the user. For example, a handheld electronic device integrated with a multimedia playing function plays a multimedia film in a manner of being horizontally placed, such that it is convenient for the user to watch the film. What's more, as for a handheld electronic device in a touch control manner, an input interface may be integrated on a screen, such that the user can input the operation information in a touch control manner. In other words, such handheld electronic device has omitted a conventional keyboard in terms of the appearance, so as to have a special appearance design. However, on the contrary, it is difficult for the user to clearly discriminate the orientation merely from the appearance of the handheld electronic device. When the user holds the handheld electronic device to make a phone call, the user may not make the phone call successfully via the microphone and the receiver since he/she holds the handheld electronic device upside down by mistake.

SUMMARY OF THE INVENTION

Accordingly, the present invention is directed to a handheld electronic device and an operating method thereof, in which a direction for carrying out a call operation is automatically switched according to a direction that a user holds the electronic device, such that the user can successfully make a phone call, even if the handheld electronic device is held upside down.

The present invention is further directed to a handheld electronic device and an operating method thereof, in which different operation modes are automatically switched according to an orientation of the handheld electronic device itself to cater to different using demands.

As embodied and broadly described herein, a handheld electronic device is provided in the present invention, which includes a body, a control module, a first sound outputting module, a second sound outputting module, a first sound receiving module, a second sound receiving module, and a motion detecting module. The body has a first side and a second side opposite to each other, and the control module is disposed in the body. The first sound outputting module, the second sound outputting module, the first sound receiving module, and the second sound receiving module are respectively coupled to the control module, in which the first sound outputting module and the second sound receiving module are disposed on the first side of the body, and the second sound outputting module and the first sound receiving module are disposed on the second side of the body. Furthermore, the motion detecting module is disposed in the body and coupled to the control module. When the motion detecting module detects that the body is located at a first orientation, and that the handheld electronic device is in a first operation mode, the first sound outputting module and the first sound receiving module are enabled by the control module. When the motion detecting module detects that the body is located at a second orientation and that the handheld electronic device is in a second operation mode, the second sound outputting module and the second sound receiving module are enabled by the control module.

Here, an operating method of a handheld electronic device is further provided, which detects an orientation of a body by a motion detecting module. When the body is located at a first orientation and the handheld electronic device is in a first operation mode, a first sound outputting module and a first sound receiving module are enabled by a control module. Furthermore, when the body is located at a second orientation and the handheld electronic device is in a second operation mode, a second sound outputting module and a second sound receiving module are enabled by the control module.

In an embodiment of the present invention, the first orientation and the second orientation are opposite to each other.

In an embodiment of the present invention, the first operation mode or the second operation mode includes functions of receiving a call and dialing a call.

In an embodiment of the present invention, the first side and the second side are respectively two sides of the body along a major axis direction thereof.

In an embodiment of the present invention, when the motion detecting module detects that the body is located at a third orientation and that the handheld electronic device is in a third operation mode, the first sound outputting module and the second sound outputting module are enabled by the control module. Furthermore, when the first sound outputting module and the second sound outputting module are enabled, output powers of both the first sound outputting module and the second sound outputting module are further increased.

When the body is located at the third orientation, a major axis direction of the body is substantially parallel with a horizontal plane.

In an embodiment of the present invention, the third operation mode includes an audio-visual playing function.

In an embodiment of the present invention, the motion detecting module includes at least one acceleration detector or at least one gyro.

Accordingly, in the handheld electronic device and the operating method thereof according to the present invention, at least two sets of sound outputting modules and sound receiving modules are disposed, and the orientation of the body is detected by the motion detecting module, so as to enable different sets of sound outputting modules and sound receiving modules according to a variation of the orientation of the body, so as to change a direction of the call operation, and thus, a user can successfully make a phone call, even if the handheld electronic device is held upside down. Furthermore, the present invention can control the enabling status and operating power of each sound outputting module and sound receiving module depending upon other operation demands, for example, the handheld electronic device is required to be placed horizontally for an audio-visual playing function, so as to achieve a multifunctional product design.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
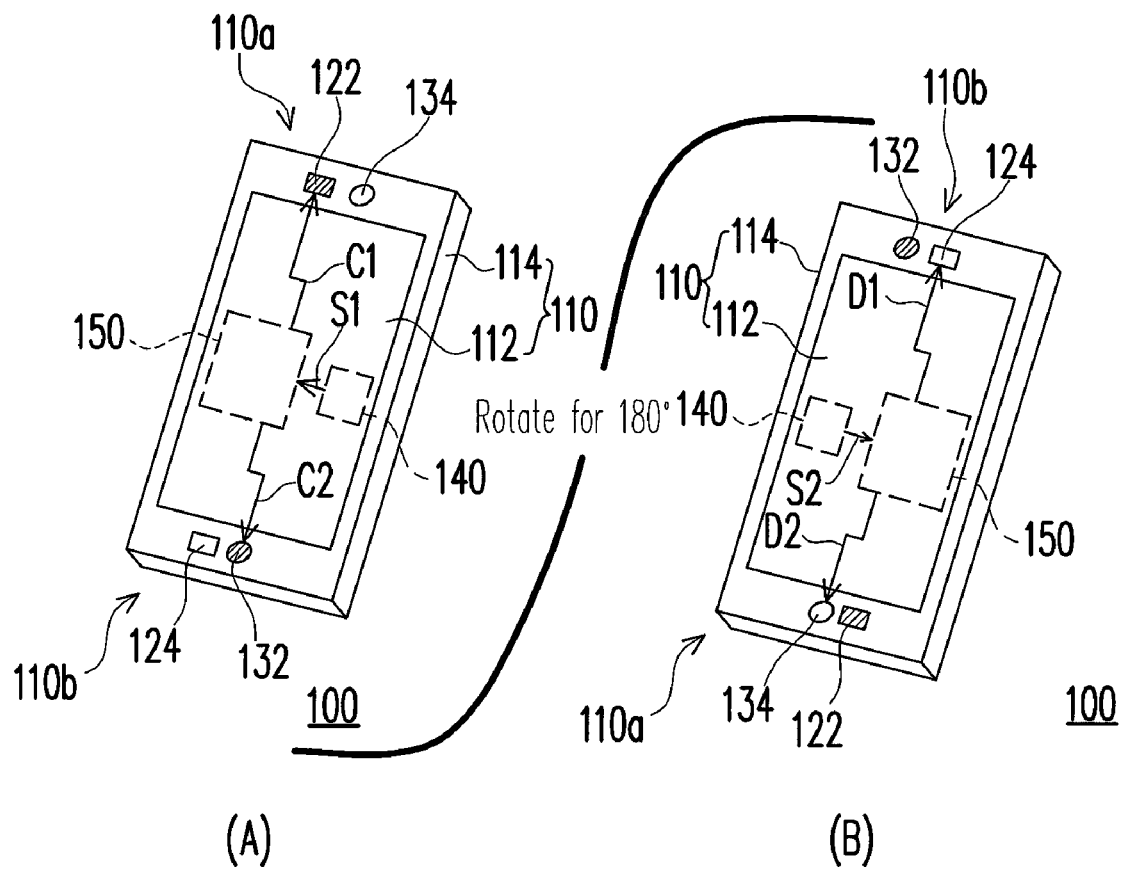
FIGS. 1A and 1B respectively show operation modes of a handheld electronic device at different orientations according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIGS. 1A and 1B respectively show operation modes of a handheld electronic device at different orientations according to an embodiment of the present invention. Referring to FIGS. 1A and 1B, a handheld electronic device 100 includes a body 110, a first sound outputting module 122, a second sound outputting module 124, a first sound receiving module 132, a second sound receiving module 134, a motion detecting module 140, and a control module 150. The body 110 includes a screen 112, a case 114, and the like, and further has a first side 110a and a second side 110b opposite to each other. In this embodiment, the first side 110a and the second side 110b respectively refer to an upper side and a lower side of the handheld electronic device 100 when it is vertically placed. The handheld electronic device 100 shown in FIG. 1A is vertically placed in a normal direction, and the handheld electronic device 100 shown in FIG. 1B is vertically placed in an inversed direction. However, when a user uses the handheld electronic device 100 to dial a call and receive a call, the handheld electronic device 100 is not always held in a manner of being vertical to the horizontal plane, but it is possible to form an angle of 60 degrees, 75 degrees, or other degrees with respect to the horizontal plane.

Referring to FIGS. 1A and 1B, the control module 150 is disposed in the body 110, for controlling the motions of each element in the handheld electronic device 100. The first sound outputting module 122, the second sound outputting module 124, the first sound receiving module 132, and the second sound receiving module 134 are respectively coupled to the control module 150 and are controlled by the control module 150. Furthermore, the first sound outputting module 122 and the second sound receiving module 134 are disposed on the first side 110a of the body 110, and the second sound outputting module 124 and the first sound receiving module 132 are disposed on the second side 110b of the body 110. In this embodiment, in order to achieve the phone-call function, the first sound outputting module 122 or the second sound outputting module 124 is, for example, a loudspeaker serving as a receiver, and the first sound receiving module 132 or the second sound receiving module 134 is, for example, a microphone in the body 110.

The motion detecting module 140 is disposed in the body 110, and is coupled to the control module 150. The motion detecting module 140 adopted here may include at least one acceleration detector, for detecting an orientation of the body 110, so as to output corresponding detecting signals S1 and S2 to the control module 150. Alternatively, the motion detecting module 140 may also include at least one gyro, for detecting the orientation of the body 110, so as to output corresponding detecting signals S1 and S2 to the control module 150.

Figure 2:
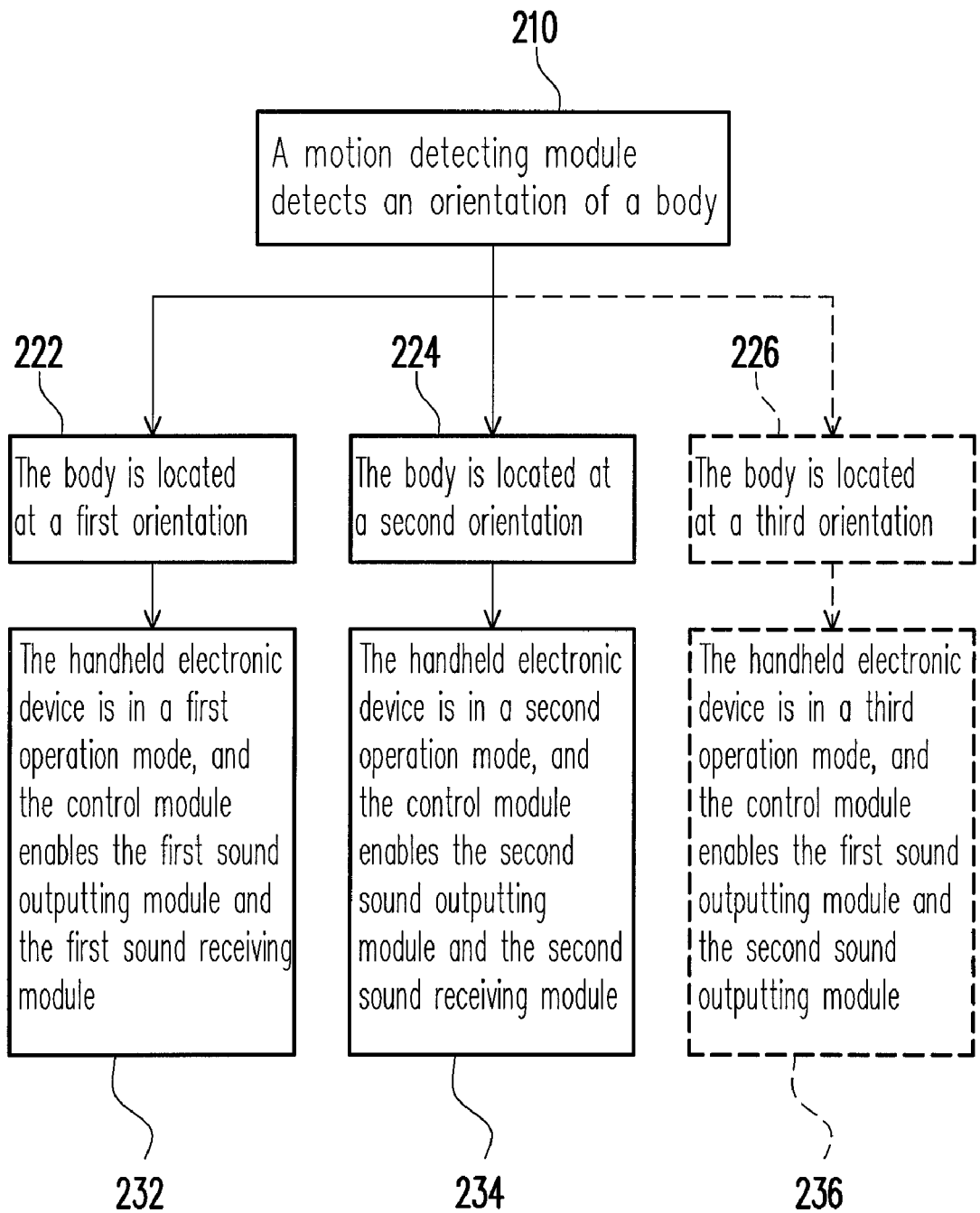
FIG. 2 shows an operating flow of the handheld electronic device according to the embodiment of the present invention.

In the following, the operating method of the handheld electronic device 100 shown in FIG. 2 is further illustrated, so as to describe an actuation manner that the handheld electronic device 100 switches among different operation modes according to a variation of the orientation of the body 110.

Referring to FIGS. 1A and 2, as shown in a block 210, the handheld electronic device 100 detects the orientation of the body 110 by the motion detecting module 140. When the handheld electronic device 100 is vertically placed in a normal direction as shown in FIG. 1A, the motion detecting module 140 detects that the body 110 is located at a first orientation (shown in a block 222), so as to correspondingly output a detecting signal S1 to the control module 150. At this time, the handheld electronic device 100 is, for example, in a first operation mode. After receiving the detecting signal S1, the control module 150 correspondingly outputs control signals C1 and C2 to the first sound outputting module 122 and the first sound receiving module 132, so as to enable the first sound outputting module 122 and the first sound receiving module 132 (as shown in a block 232).

In other words, taking the phone-call function for an example, when the user holds the handheld electronic device 100 in such a manner that the handheld electronic device 100 is vertically placed in a normal direction, the first sound outputting module 122 located at the first side 110a is enabled to serve as the receiver, so as to provide the function of receiving a call. The first sound receiving module 132 located at the second side 110b is enabled to serve as a microphone, so as to provide the function of dialing a call.

Referring to FIGS. 1B and 2, when the handheld electronic device 100 is vertically placed in an inversed direction as shown in FIG. 1B, that is, when it is held upside down, the motion detecting module 140 detects that the body 110 is located at a second orientation (as shown in a block 222), and correspondingly outputs a detecting signal S2 to the control module 150. At this time, the handheld electronic device 100 is, for example, in a second operation mode. After receiving the detecting signal S2, the control module 150 correspondingly outputs control signals D1 and D2 to the second sound outputting module 124 and the second sound receiving module 134, so as to enable the second sound outputting module 124 and the second sound receiving module 134 (as shown in a block 234).

In other words, taking the phone-call function for an example, when the user holds the handheld electronic device 100 upside down, the second sound outputting module 124 located at the second side 110b is enabled to serve as the receiver, so as to provide the function of receiving a call. The second sound receiving module 134 located at the first side 110a is enabled to serve as the microphone, so as to provide the function of dialing a call.

In the handheld electronic device 100 and the operating method thereof in the above embodiment, at least two sets of sound outputting modules 122 and 124 and sound receiving modules 132 and 134 are disposed, and the orientation of the body 110 is detected by the motion detecting module 140, so as to enable different sets of sound outputting modules 122 and 124 and sound receiving modules 132 and 134 according to the variation of the orientation of the body 110, thereby changing the direction of the call operation, and thus, the user can successfully make a phone call, even if the handheld electronic device 100 is held upside down.

In addition to the above embodiment, the present invention can further control the enabling status and operating power of each sound outputting module and sound receiving module depending upon different operation demands, so as to achieve a multifunctional product design. In the following, the operating method of the handheld electronic device with the audio-visual playing function is illustrated.

Figure 3:
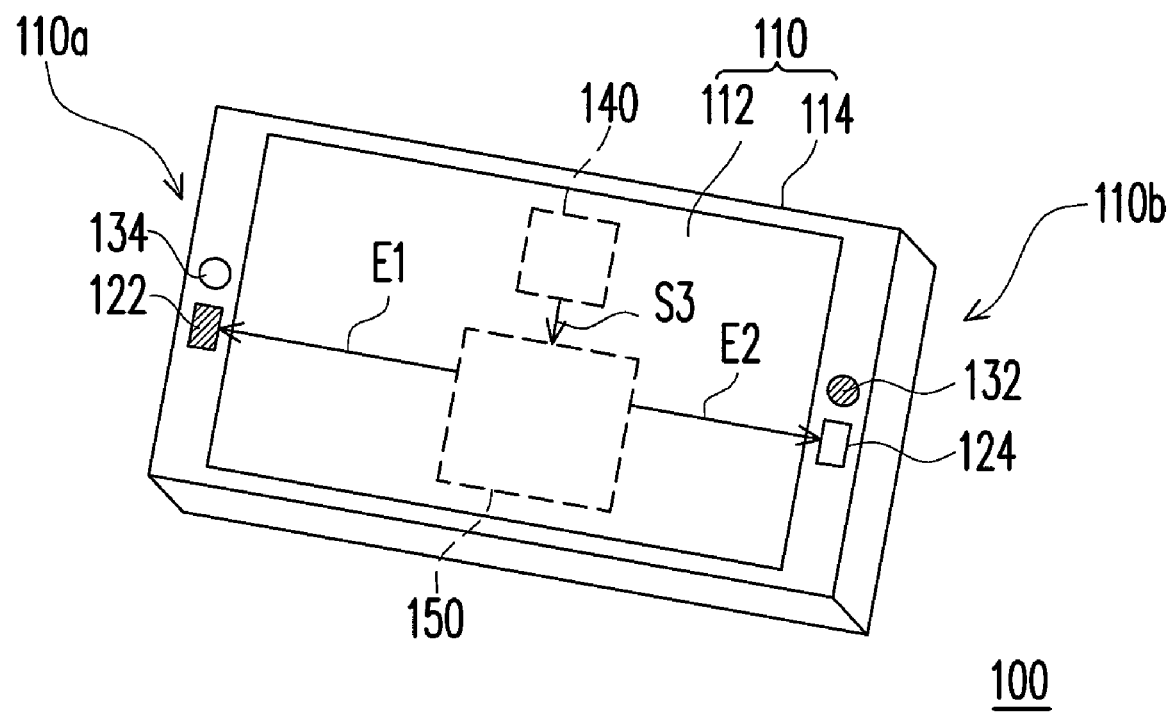
FIG. 3 shows an operation mode of the handheld electronic device according to the embodiment of the present invention, when it is horizontally placed.

The handheld electronic device 100 shown in FIG. 1A is cited, and FIG. 3 shows an operation mode of the handheld electronic device 100 when it is horizontally placed to play multimedia files. Under possible situations, the descriptions of a part of the elements are omitted in this embodiment, but the connection relations and technical details of the elements can be obtained with reference to the above embodiment, which thus will not be described here.

Referring to FIGS. 2 and 3, for the user's convenience of watching the multimedia files, the handheld electronic device 100 is horizontally placed. In other words, the first sound outputting module 122 and the second sound outputting module 124 are substantially located on the same horizontal plane, that is, a major axis direction of the body 110 is substantially parallel with the horizontal plane. The motion detecting module 140 detects that the body 110 is located at a third orientation (as shown in a block 226), and correspondingly outputs a detecting signal S3 to the control module 150. At this time, the handheld electronic device 100 is, for example, in a third operation mode, so as to provide the audio-visual playing function. After receiving the detecting signal S3, the control module 150 correspondingly outputs control signals E1 and E2 to the first sound outputting module 122 and the second sound outputting module 124, so as to enable the first sound outputting module 122 and the second sound outputting module 124 (as shown in a block 236).

When the user places the handheld electronic device 100 horizontally to watch the films played on the screen 112, the first sound outputting module 122 and the second sound outputting module 124 located on the left and right sides of the screen 112 respectively serve as loudspeakers for left and right sound channels, for providing stereophonic effects. On the other hand, in this embodiment, the output powers of both the first sound outputting module 122 and the second sound outputting module 124 may be increased by the control module 150, so as to enhance the sound effect.

To sum up, the present invention can control the enabling status and operating powers of each sound outputting module and sound receiving module depending upon different operation demands, for example, the call operation is performed while holding the handheld electronic device normally or inversely, or multimedia files are played while the handheld electronic device is placed horizontally. Definitely, the operation modes in the above embodiment are merely intended to exemplify the present invention, but not to limit the scope of the present invention. Particularly, the present invention may individually or collectively control the sound outputting modules and the sound receiving modules in the handheld electronic device according to the actual demands, so as to achieve a multifunctional product design.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
   a body, having a first side and a second side opposite to each other;
   a control module, disposed in the body;
   only two sound outputting modules, including a first sound outputting module disposed on the first side of the body and coupled to the control module, and a second sound outputting module disposed on the second side of the body and coupled to the control module;
   only two sound receiving module, including a first sound receiving module disposed on the second side of the body and coupled to the control module, and a second sound receiving module disposed on the first side of the body and coupled to the control module; and
   a motion detecting module, disposed in the body and coupled to the control module, wherein
   when the motion detecting module detects that the body is located at a first orientation and that the handheld electronic device is in a first operation mode, the first sound outputting module and the first sound receiving module are enabled by the control module, and the second sound outputting module and the second receiving module are disabled by the control module;
   when the motion detecting module detects that the body is located at a second orientation and that the handheld electronic device is in a second operation mode, the second sound outputting module and the second sound receiving module are enabled by the control module, and the first sound outputting module and the first sound receiving module are disabled by the control module; and
   when the motion detecting module detects that the body is oriented to a third orientation and that the handheld electronic device is in a third operation mode to perform an audio-visual playing function, a major axis direction of the body is substantially parallel with a horizontal plane, both of the first sound outputting module and the second sound outputting module are enabled by the control module, and both of the first sound receiving module and the second sound receiving module are disabled by the control module.

2. The handheld electronic device according to claim 1, wherein the first orientation is opposite to the second orientation.

3. The handheld electronic device according to claim 1, wherein the first side and the second side are respectively two sides of the body along a major axis direction.

4. The handheld electronic device according to claim 1, wherein the first operation mode or the second operation mode comprises functions of receiving a call and dialling a call.

5. The handheld electronic device according to claim 1, wherein when the body is located at the third orientation and both the first sound outputting module and the second sound outputting module are enabled at the same time, output powers of both the first sound outputting module and the second sound outputting module are increased.

6. The handheld electronic device according to claim 1, wherein the motion detecting module comprises at least one acceleration detector or at least one gyro.

7. An operating method of a handheld electronic device, comprising:
provoding the handheld electronic device as claimed in claim 1;
detecting an orientation of the body by the motion detecting module;
enabling the first sound outputting module and the first sound receiving module by the control module, when the body is located at a first orientation and the handheld electronic device is in a first operation mode;
enabling the second sound outputting module and the second sound receiving module by the control module, when the body is located at a second orientation and the handheld electronic device is in a second operation mode; and
enabling both of the first sound outputting module and the second sound outputting module by the control module, when the motion detecting module detects that the body is oriented to a third orientation with a major axis direction of the body being substantially parallel with a horizontal plane and that the handheld electronic device is in a third operation mode to perform an audio-visual playing function.

8. The operating method of a handheld electronic device according to claim 7, wherein the first orientation is opposite to the second orientation.

9. The operating method of a handheld electronic device according to claim 7, wherein the first operation mode or the second operation mode comprises functions of receiving a call and dialling a call.

10. The operating method of a handheld electronic device according to claim 7, further comprising increasing output powers of both the first sound outputting module and the second sound outputting module, when both the first sound outputting module and the second sound outputting module are enabled by the control module.

11. The handheld electronic device according to claim 1, wherein the first sound outputting module and the second sound receiving module are located at the center of the first side of the body, and the first sound receiving module and the second sound outputting module are located at the center of the second side of the body.

12. The handheld electronic device according to claim 1, wherein the first sound outputting module and the second sound outputting module are aligned with each other in parallel with the major axis direction of the body.

* * * * *